United States Patent
Jamshidiat et al.

(10) Patent No.: US 9,617,918 B2
(45) Date of Patent: Apr. 11, 2017

(54) BRACKET FOR MOUNTING/REMOVAL OF ACTUATORS FOR ACTIVE VIBRATION CONTROL

(71) Applicant: The Boeing Company, Chicago, IL (US)

(72) Inventors: Hamid Jamshidiat, Bellevue, WA (US); Michael D. Jones, Kirkland, WA (US); Laila M. Elias, Seattle, WA (US)

(73) Assignee: The Boeing Company, Chicago, IL (US)

( * ) Notice: Subject to any disclaimer, the term of this patent is extended or adjusted under 35 U.S.C. 154(b) by 562 days.

(21) Appl. No.: 14/153,238

(22) Filed: Jan. 13, 2014

(65) Prior Publication Data

US 2015/0198093 A1 Jul. 16, 2015

(51) Int. Cl.
*F02C 7/20* (2006.01)
*F01D 25/04* (2006.01)
*B64D 27/26* (2006.01)

(52) U.S. Cl.
CPC .............. *F02C 7/20* (2013.01); *B64D 27/26* (2013.01); *F01D 25/04* (2013.01); *B64D 2027/262* (2013.01); *Y10T 29/49826* (2015.01)

(58) Field of Classification Search
CPC ........ B64D 27/12; B64D 27/18; B64D 27/26; B64D 2027/262; B64D 2700/62508; F16M 7/00; Y02C 7/20; F01D 25/04; Y10T 29/49826
USPC ........ 60/796–798; 29/428; 244/54; 248/200, 248/205.1, 309.1, 554, 557
See application file for complete search history.

(56) References Cited

U.S. PATENT DOCUMENTS

| | | | | |
|---|---|---|---|---|
| 3,385,557 A | * | 5/1968 | Rambelle | ................ E04C 3/29 249/210 |
| 4,949,929 A | * | 8/1990 | Kesselman | ............ A47B 96/06 248/220.1 |
| 5,018,698 A | * | 5/1991 | Tobias | ................... B60G 13/14 248/550 |
| 5,049,768 A | | 9/1991 | Andersson | |

(Continued)

FOREIGN PATENT DOCUMENTS

| | | |
|---|---|---|
| EP | 0455355 | 6/1991 |
| EP | 0786131 | 10/1995 |

(Continued)

OTHER PUBLICATIONS

European Search Report, European Application No. 14187053, dated May 13, 2015.

*Primary Examiner* — Luan K Bui
(74) *Attorney, Agent, or Firm* — Perman & Green LLP

(57) ABSTRACT

An active vibration control actuator mount including at least one actuator bracket having an actuator interface member configured to hold one or more active vibration element thereon in one or more predetermined orientations, and an engine mounting structure interface member connected to the actuator interface member, the engine mounting structure interface member being configured to couple the at least one actuator bracket to an engine mounting structure, wherein the at least one actuator bracket is configured for the installation and removal of a respective active vibration element to and from the actuator interface member while a respective one of the at least one actuator bracket remains coupled to the engine mounting structure.

24 Claims, 9 Drawing Sheets

(56) References Cited

U.S. PATENT DOCUMENTS

| | | | |
|---|---|---|---|
| 5,065,959 A | | 11/1991 | Bhatia et al. |
| 5,108,045 A | * | 4/1992 | Law .................. B64D 27/26 |
| | | | 244/54 |
| 5,568,557 A | | 10/1996 | Ross et al. |
| 5,845,236 A | | 12/1998 | Jolly et al. |
| 6,171,540 B1 | * | 1/2001 | Ibaragi .................. B29C 45/00 |
| | | | 248/200 |
| 6,974,006 B2 | | 12/2005 | Ruckman et al. |
| 7,665,708 B2 | | 2/2010 | Stothers et al. |
| 8,439,299 B2 | | 5/2013 | Luo et al. |
| 8,555,592 B2 | * | 10/2013 | Daudet ................ E04B 1/2403 |
| | | | 52/489.1 |
| 2004/0135029 A1 | * | 7/2004 | Bansemir ................ F16F 7/12 |
| | | | 244/54 |
| 2014/0312167 A1 | * | 10/2014 | Rupp .................. B64D 41/007 |
| | | | 244/54 |

FOREIGN PATENT DOCUMENTS

| | | |
|---|---|---|
| EP | 0786057 | 12/1999 |
| GB | 2346426 | 9/2000 |
| WO | 9534769 | 12/1995 |
| WO | 2009055007 | 4/2009 |

* cited by examiner

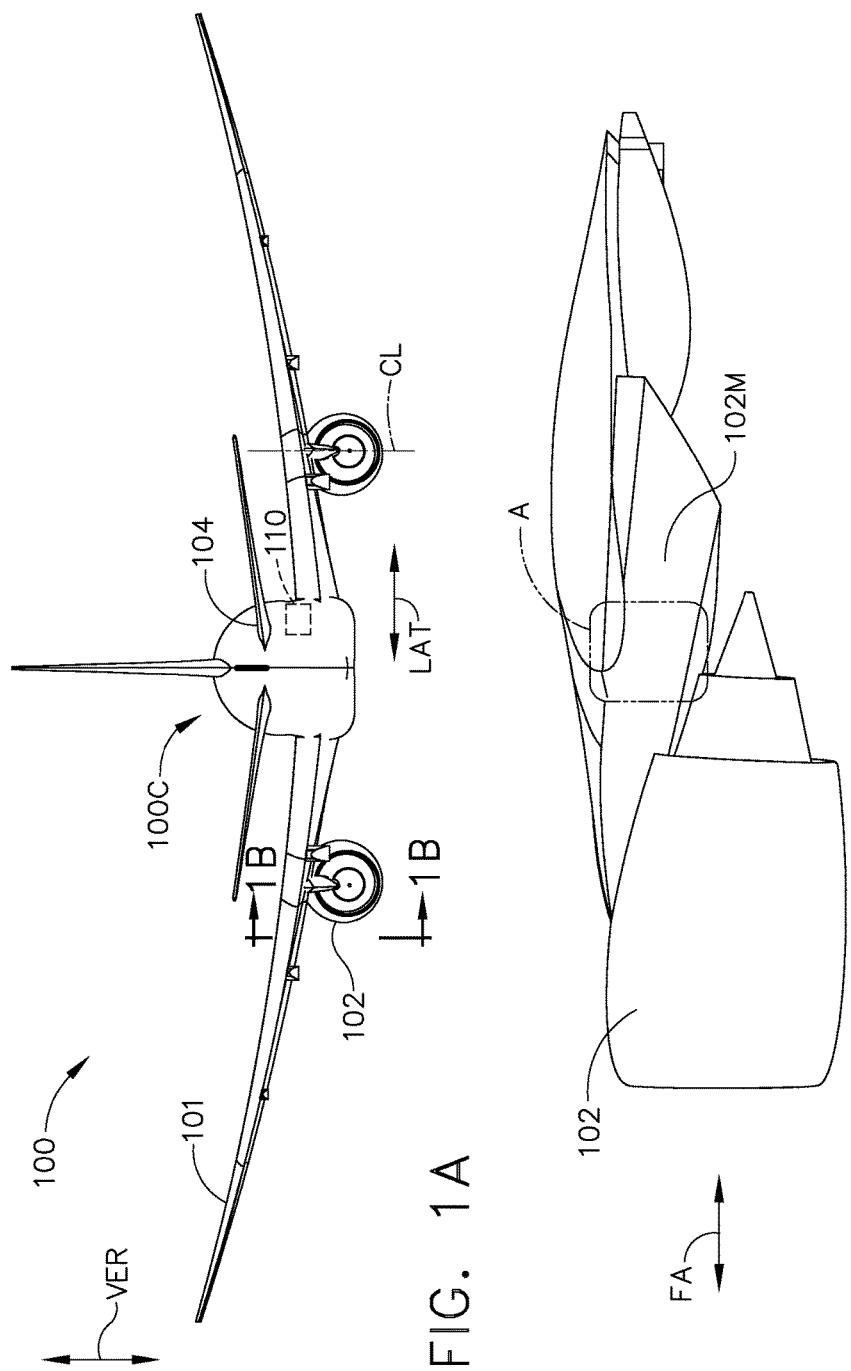

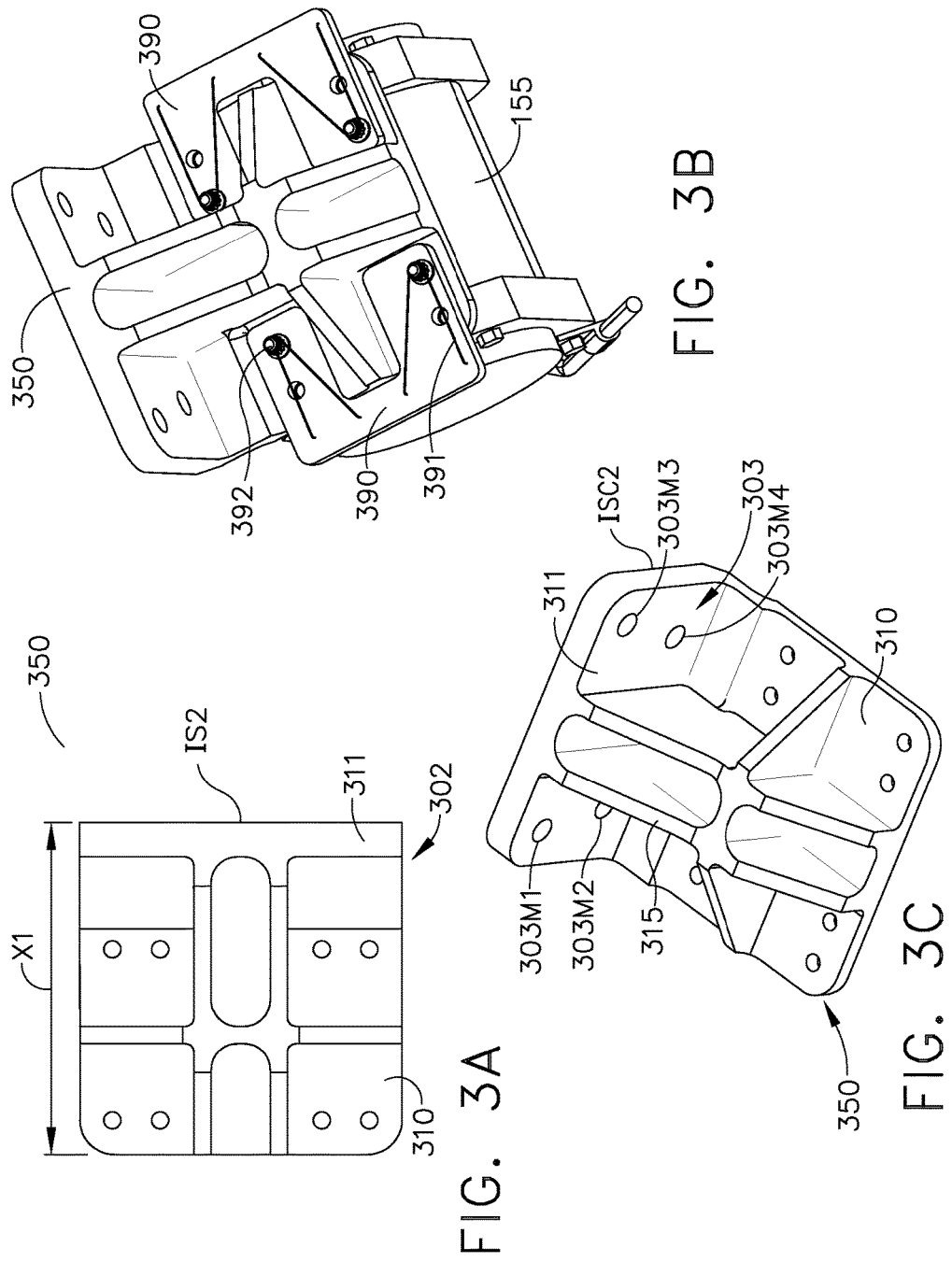

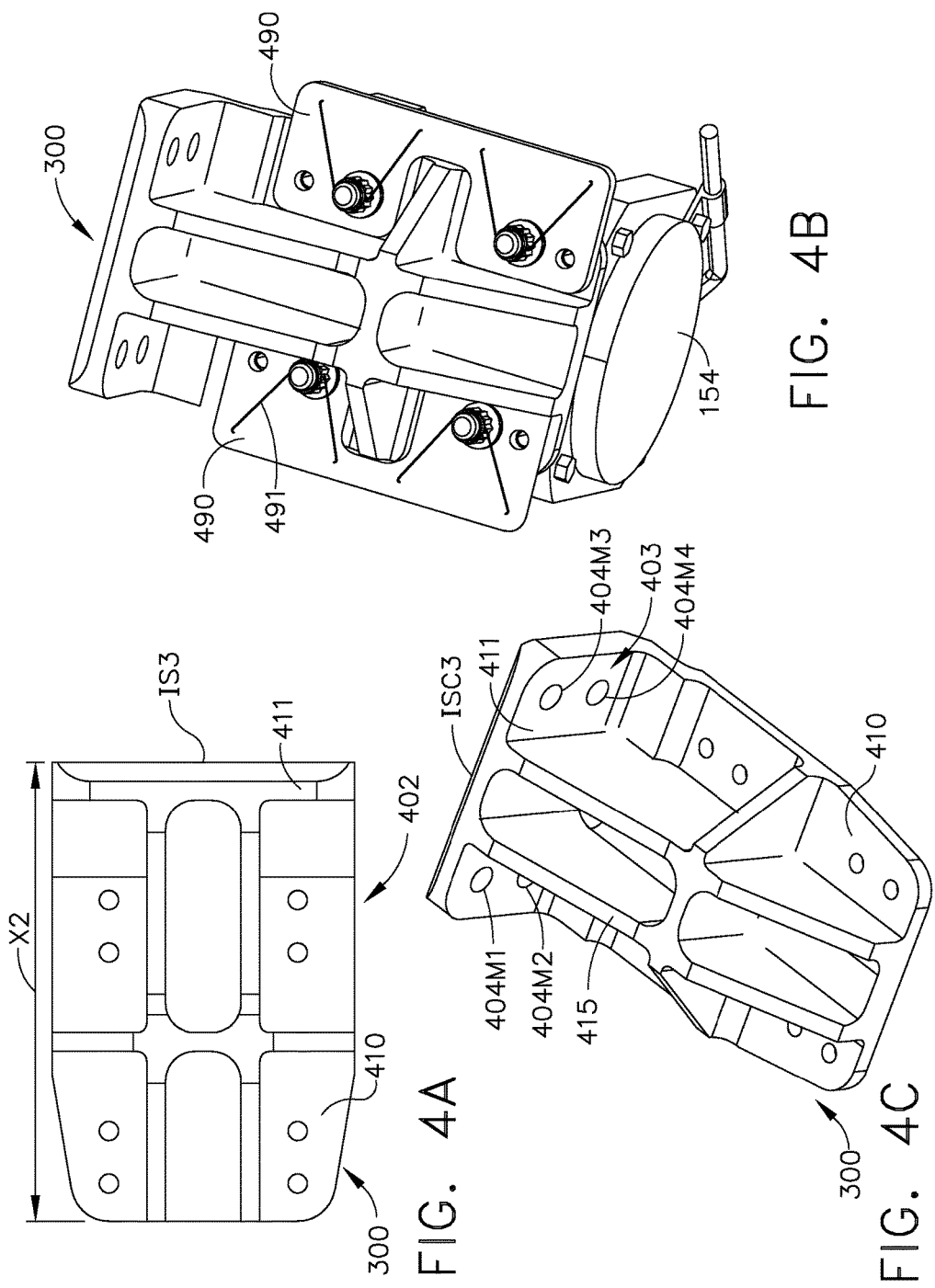

BRACKET FOR MOUNTING/REMOVAL OF ACTUATORS FOR ACTIVE VIBRATION CONTROL

BACKGROUND

1. Field

The exemplary embodiments generally relate to active vibration control and, more particularly, to actuator mounting brackets for active vibration control systems.

2. Brief Description of Related Developments

Generally active vibration control systems in aircraft use shakers or actuators (e.g. active vibration elements) to vibrate a structural component at a frequency to cancel the input disturbance (noise and/or vibration). These actuators are mounted to a portion of the aircraft using brackets that generally do not provide easy installation or removal of the actuators and/or brackets especially in retrofit applications.

It would be advantageous to have an active vibration control system actuator mounting bracket that provides substantially unhindered installation and removal of the actuators.

SUMMARY

In one aspect of the disclosed embodiment an active vibration control actuator mount includes at least one actuator bracket. The at least one actuator bracket includes an actuator interface member configured to hold one or more active vibration element thereon in one or more predetermined orientations, and an engine mounting structure interface member connected to the actuator interface member. The engine mounting structure interface member is configured to couple the at least one actuator bracket to an engine mounting structure. The at least one actuator bracket is configured for the installation and removal of a respective active vibration element to and from the actuator interface member while a respective one of the at least one actuator bracket remains coupled to the engine mounting structure.

In another aspect of the disclosed embodiment a method for mounting active vibration control actuators to an engine mounting structure is provided. The method includes providing at least one actuator bracket, providing an actuator interface member on the at least one actuator bracket for holding one or more active vibration elements thereon in one or more predetermined orientations, and providing an engine mounting structure interface member on the at least one actuator bracket and connected to the actuator interface member for coupling the at least one actuator bracket to an engine mounting structure. In the method the at least one actuator bracket provides for the installation and removal of the one or more active vibration elements from the actuator interface member while a respective one of the at least one actuator bracket remains coupled to the engine mounting structure.

In yet another aspect of the disclosed embodiment an active vibration control actuator mount includes a first actuator bracket and a second actuator bracket. The first actuator bracket includes an actuator interface member configured to hold one or more active vibration element thereon in one or more predetermined orientation, and an engine mounting structure interface member connected to the actuator interface member. The engine mounting structure interface member of the first actuator bracket is configured to couple the first actuator bracket to a first mounting location of an engine mounting structure. The second actuator bracket includes an actuator interface member configured to hold one or more active vibration element thereon in one or more predetermined orientation, and an engine mounting structure interface member connected to the actuator interface member. The engine mounting structure interface member of the second actuator bracket is configured to couple the second actuator bracket to a second mounting location of the engine mounting structure distinct from the first mounting location. Each of the first actuator bracket and the second actuator bracket are configured for the installation and removal of a respective active vibration element to and from the actuator interface member while a respective one of the first actuator bracket and second actuator bracket remains coupled to the engine mounting structure.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The foregoing aspects and other features of the disclosed embodiment are explained in the following description, taken in connection with the accompanying drawings, wherein:

FIG. 1A is a schematic illustration of a fixed wing aircraft incorporating aspects of the disclosed embodiment;

FIG. 1B is a schematic illustration of a portion of the fixed wing aircraft of FIG. 1A;

FIGS. 3A, 3B and 3C are schematic illustrations of an actuator mounting bracket in accordance with aspects of the disclosed embodiment; and FIGS. 4A, 4B and 4C are schematic illustrations of an actuator mounting bracket in accordance with aspects of the disclosed embodiment.

DETAILED DESCRIPTION

Figure 1C:
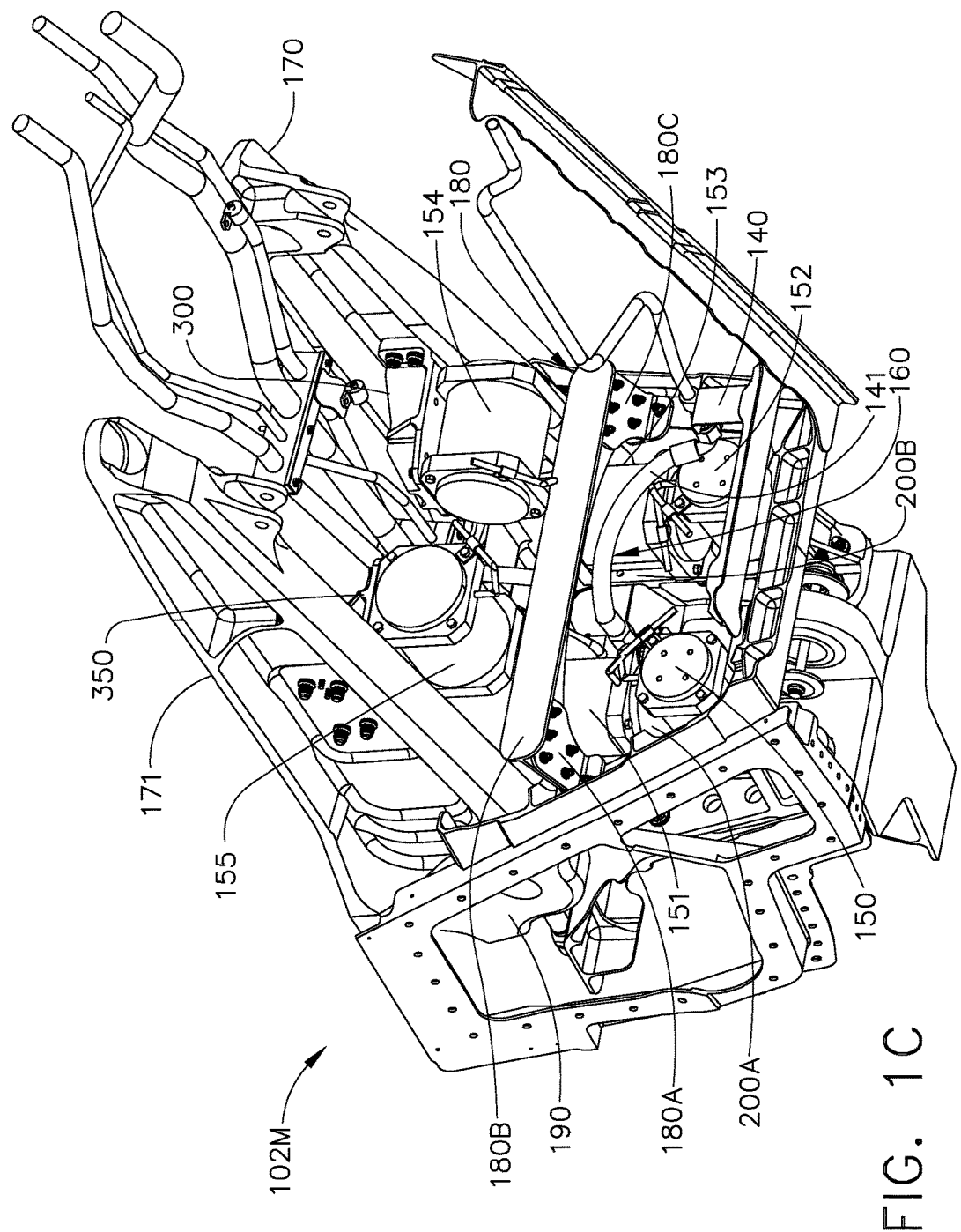
FIGS. 1C-1E are schematic illustrations of actuator mountings in the aircraft of FIG. 1A in accordance with aspects of disclosed embodiment.

FIG. 1 is a schematic illustration of a fixed wing aircraft 100 incorporating aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

In one aspect the aircraft 100 may be a Boeing 737 and in particular a Boeing 737NG. Generally active vibration control systems 110 may be used on the aircraft 100 to reduce engine vibrations. The active vibration control systems 110 may include any suitable sensors for sensing noise and/or vibration from e.g. aircraft engines 102 mounted to the wings 101 and/or fuselage 104 of the aircraft 100. The active vibration control systems 110 may also include one or more actuators 150-155 (FIG. 1C) for inducing counter-acting vibrations for reducing or otherwise cancelling the structure-borne noise and/or vibration that is transmitted from the engines 102 into the cabin 100C of the aircraft 100. The use of active vibration control systems may, for example, improve ride comfort, reduce costs of engine balancing, and improve fuel burn. As may be realized the sensors and actuators may be connected to any suitable controller for controlling the vibrational force generated by the actuators based on signals from the sensors where the signals correspond to the noise and/or vibration of the engines 102.

Referring also to FIG. 1B, as may be realized, the engines 102 are mounted to any suitable portion of the aircraft, such as the wings 101 or fuselage 104, using any suitable engine mounting structure 102M. The aspects of the disclosed embodiment described herein includes active vibration control actuator mounting brackets configured to mount one or more actuators 150-155 to the engine mounting structure 102M. The brackets may be dynamically tuned such that their modes of vibration are outside the actuator frequency of operation. The brackets may also be designed or otherwise configured for loads induced by the actuators 150-155 and for mounting of the brackets and actuators to an existing aircraft structure, such as e.g. the engine mounting structure 102M, with minimal modifications to the aircraft structure while allowing for easy or otherwise unhindered access to the actuators 150-155 for installation and/or removal of the actuators 150-155 for any suitable purpose while respective brackets remain installed or otherwise affixed to the aircraft structure. As such, the brackets described herein may be configured for retrofitting an active vibration control system to an aircraft where the brackets are provided individually or as a kit.

Figure 1D:
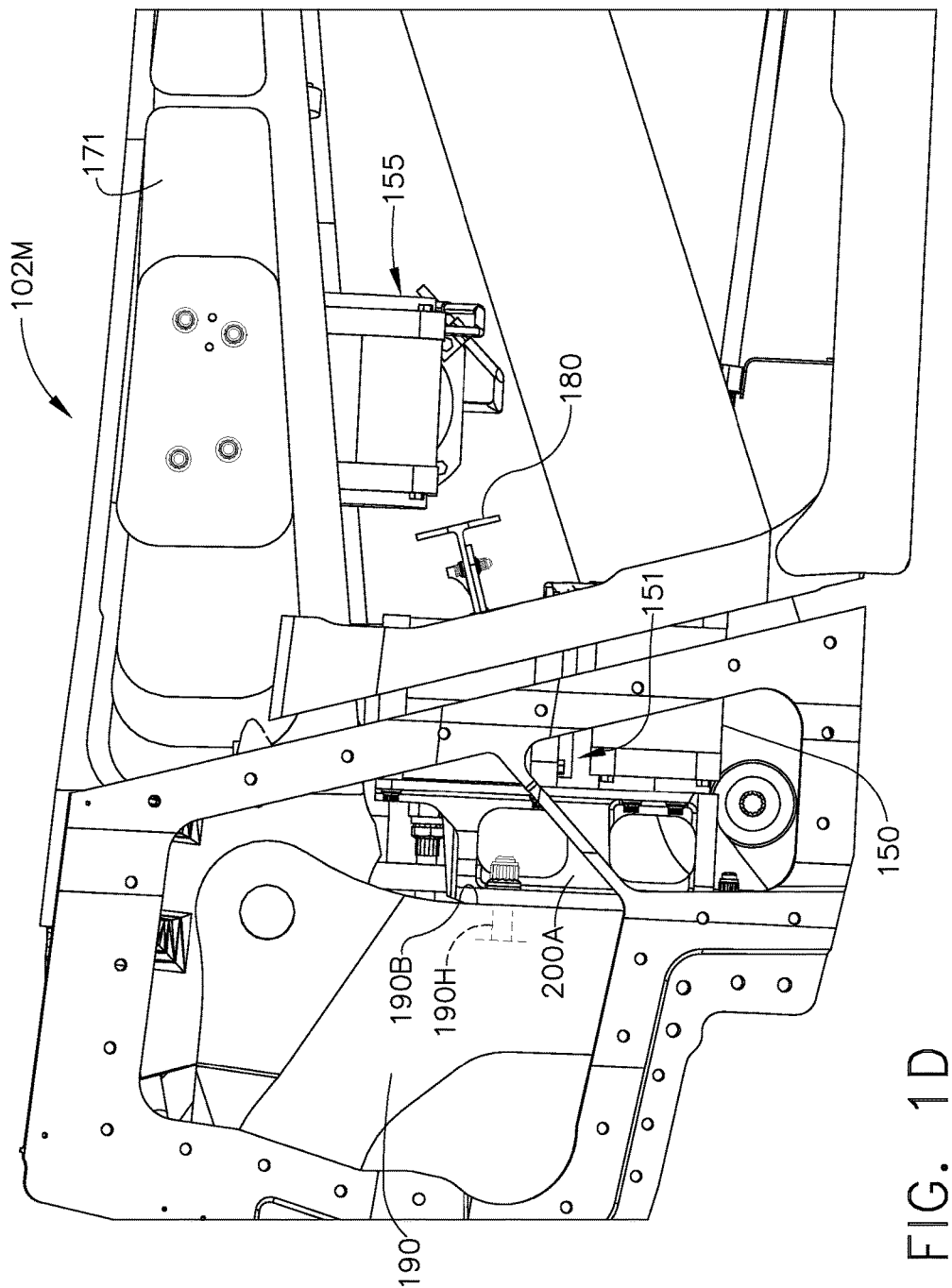
Figure 1E:
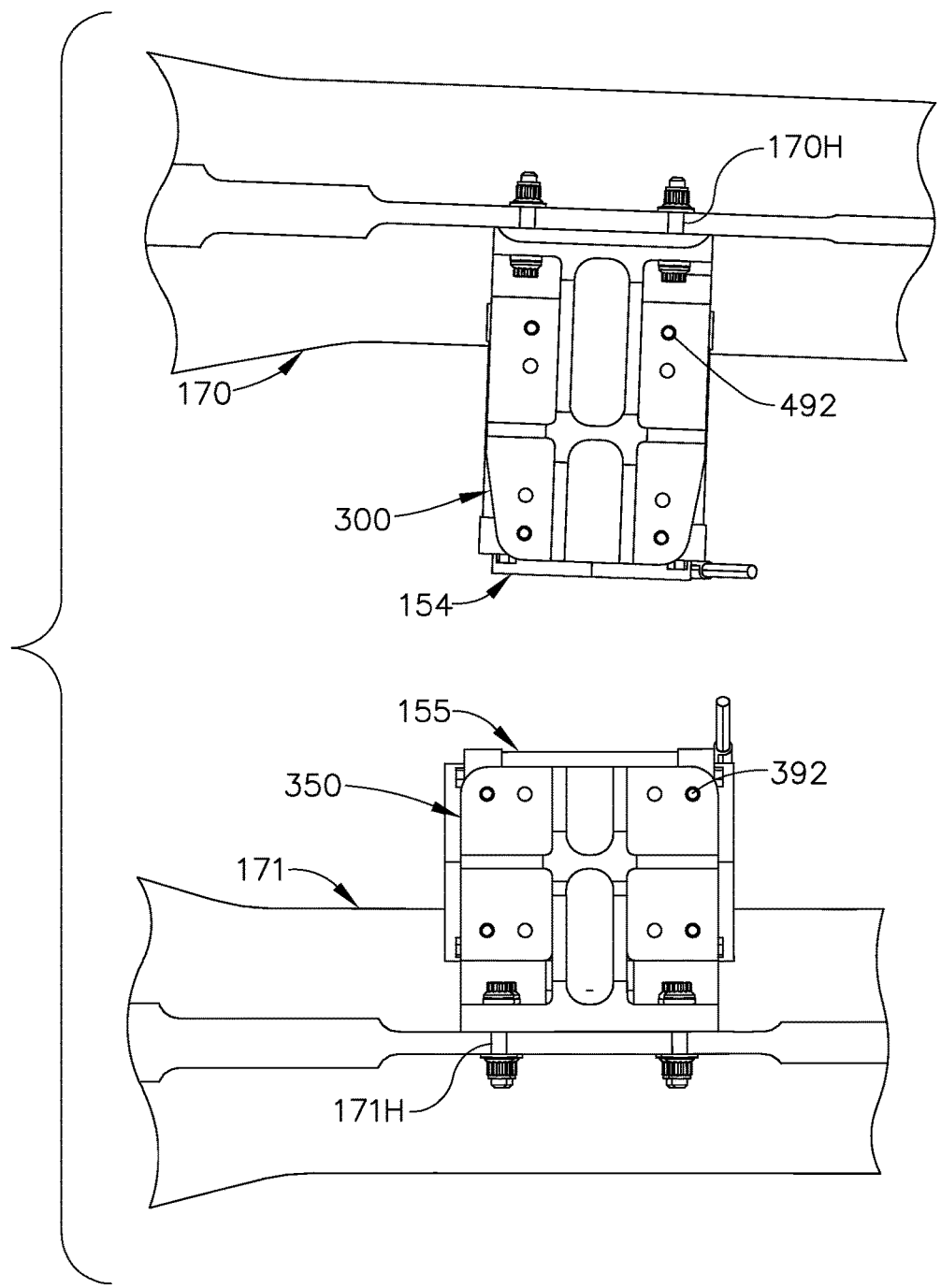
Figure 2A:
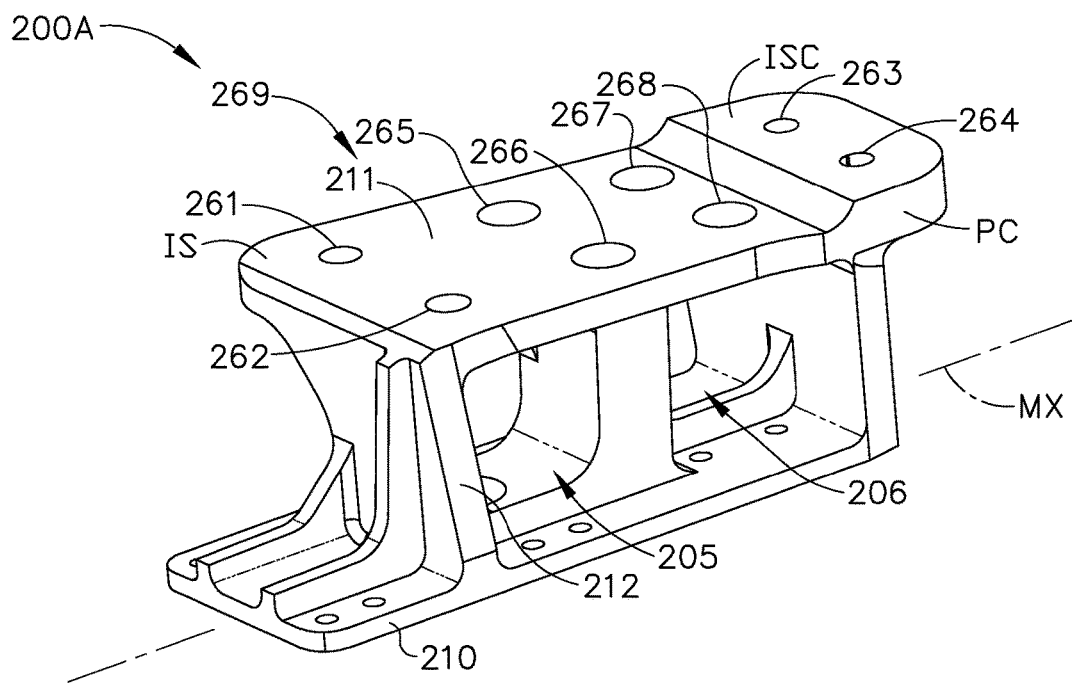
FIGS. 2A, 2B, 2C and 2D are schematic illustrations of an actuator mounting bracket in accordance with aspects of the disclosed embodiment.
Figure 2B:
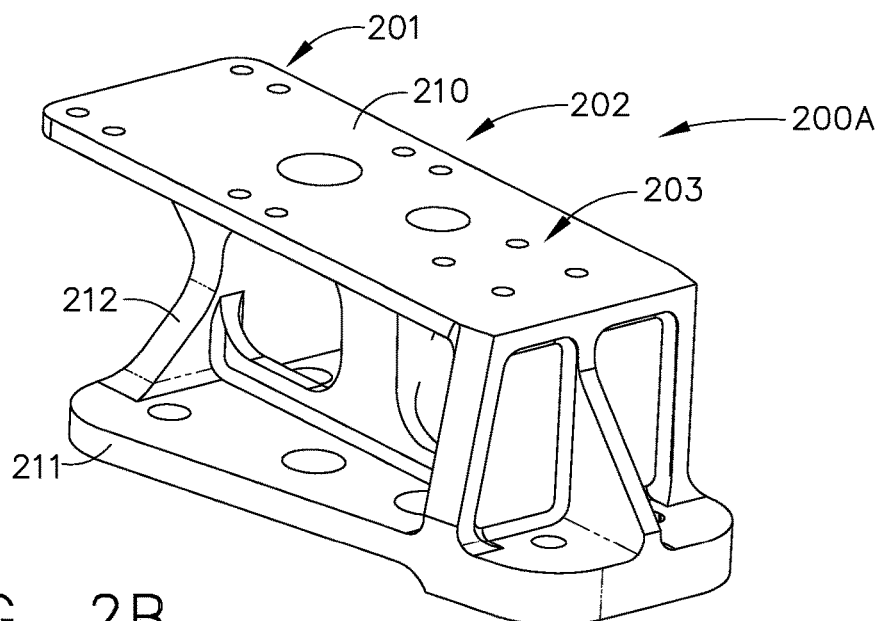
Figure 2C:
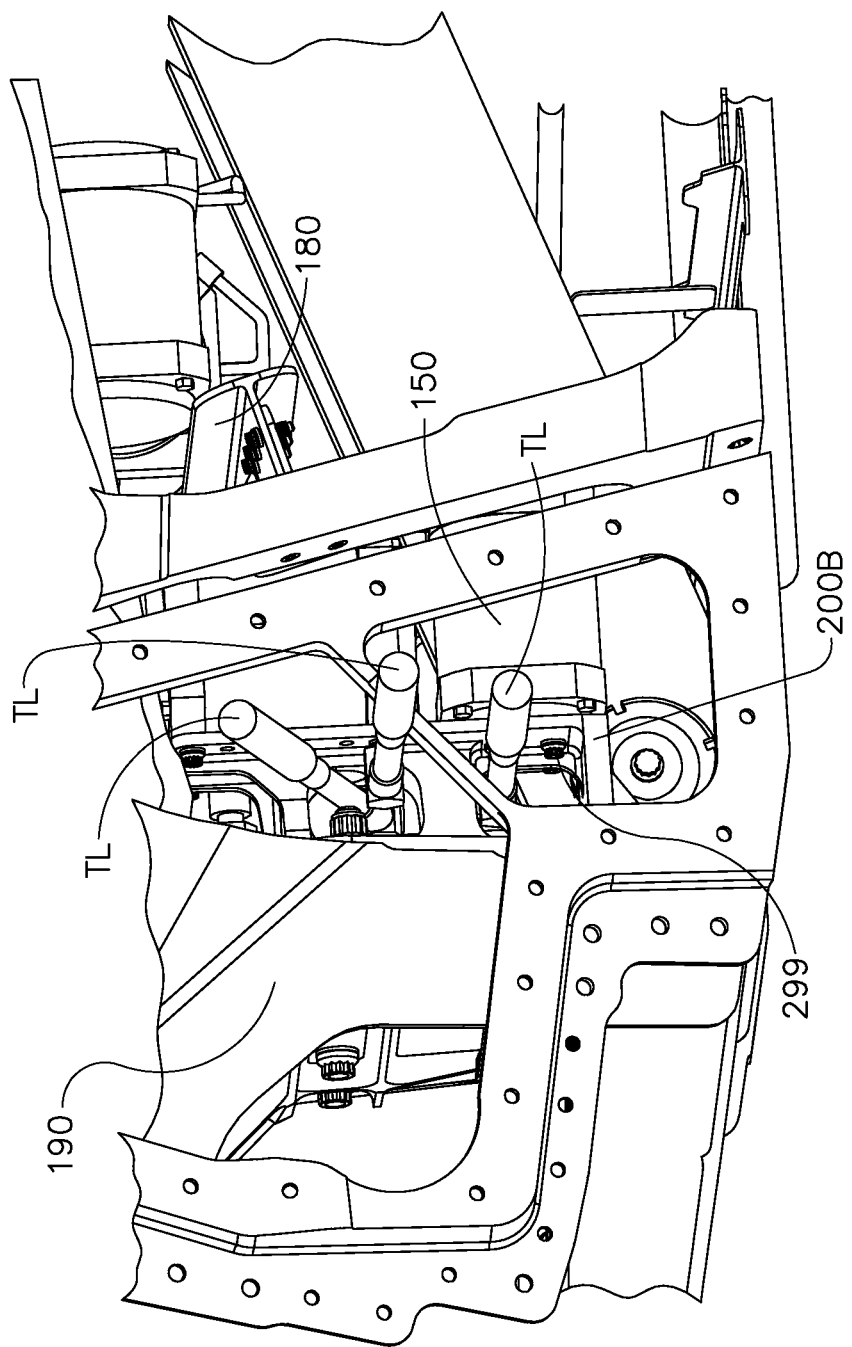
Figure 2D:
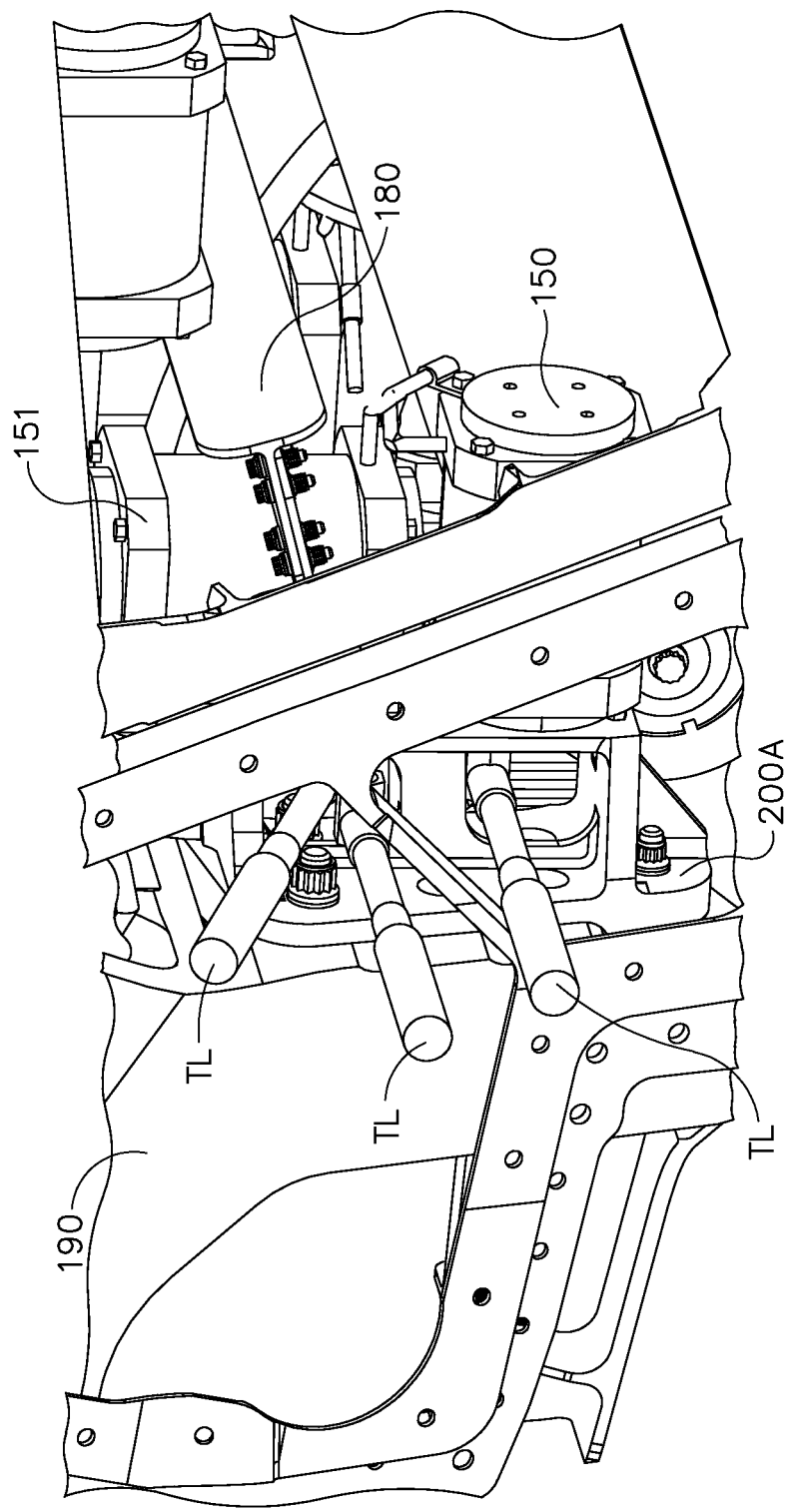

Referring also to FIGS. 1C-1E one or more actuator mounting brackets 200A, 200B, 300, 350 are illustrated as being mounted to the engine mounting structure 102M. In this aspect the engine mounting structure includes an inboard wing fitting 170, an outboard wing fitting 171 and an engine strut 190 having an engine strut aft bulkhead 190B. One or more actuator brackets 200A, 200B may be mounted to the aft engine strut bulkhead and one or more brackets 300, 350 may be mounted to the inboard and/or outboard wing fittings 170, 171. In other aspects the actuator brackets 200A, 200B, 300, 350 may be mounted to any suitable structure or components of the engine mounting structure 102M. In this aspect each bracket 200A, 200B is configured for mounting two actuators (e.g. actuators 150, 151 are mounted to bracket 200A and actuators 152, 153 are mounted to bracket 200B) while each of the brackets 300, 350 are configured for mounting a single actuator (e.g. actuator 154 is mounted to bracket 300 and actuator 155 is mounted to bracket 350). In other aspects each of the brackets 200A, 200B, 300, 350 may be configured such that any suitable number of actuators can be mounted to a respective bracket. As may be realized, each bracket may be configured to mount the respective actuators in a predetermined orientation relative to the axes (e.g. fore/aft axis—see arrow FA in FIG. 1B, inboard/outboard or lateral axis—see arrow LAT in FIG. 1A and top/bottom or vertical axis—see arrow VER in FIG. 1A) of the aircraft 100 for counteracting vibrations/noise along one or more of these axes as will be described below to provide vibration/noise cancellation and/or suppression in any suitable number of degrees of freedom such as, for example, six degrees of freedom. Here six actuators 150-155 are mounted to their respective brackets 200A, 200B, 300, 350 adjacent the engine 102 for applying vibration cancellation/suppression to reduce vibration and noise sensed in the cabin. In other aspects any suitable number of actuators may be used. It is noted that each engine 102 of the aircraft may include brackets and actuators having an arrangement substantially similar to that shown and described herein. In one aspect, the brackets 200A, 200B, 300, 350 may provide a modular active vibration control mounting system such that each bracket is configured for mounting of actuators to the bracket in one or more of the predetermined orientations described above. One or more of the brackets 200A, 200B, 300, 350 may be mounted to the engine mounting structure to cancel or reduce vibrations along any desired axis. It is noted that one or more of the brackets 200A, 200B, 300, 350 may provide actuator mounting along one or more common axes so that the actuator forces may be combined for countering vibrational forces of, for example, a respective engine 102 along or on different portions of the engine mounting structure. For example, as can be seen in FIG. 1C brackets 200A, 200B provide mounting of actuators along one or more of the fore/aft and vertical axes, bracket 300 provides actuator mounting along the lateral axis and bracket 350 provides actuator mounting along the fore/aft axis. In one aspect, bracket 300 may be mounted to the outboard wing fitting 171 and bracket 350 may be mounted to the inboard wing fitting 170 for changing a force application location of their respective actuators. In other aspects one of a bracket 350 may be mounted to each of the inboard and outboard wing fitting 170, 171 for providing an actuator force application in the fore/aft direction to each of the wing fittings 170, 171. In still other aspects one of a bracket 300 may be mounted to each of the inboard and outboard wing fitting 170, 171 for providing an actuator force application in the lateral direction to each of the wing fittings 170, 171. As may be realized, while each bracket 200A, 200B is configured to hold two actuators, each along a different axis (e.g. in this example, along the vertical and fore/aft axes) in other aspects, only one actuator may be mounted to the bracket 200A, 200B along, e.g., one of the vertical or fore/aft axes leaving the other mounting location empty.

Referring now to FIGS. 1D, 2A, 2B, 2C and 2D the bracket 200A will be described. It is noted that the bracket 200B is substantially similar to bracket 200A however, the features of bracket 200B may be mirrored about axis MX to form inboard (e.g. bracket 200B) and outboard (e.g. bracket 200A) brackets that substantially follow a contour of the engine strut aft bulkhead 190B, where the terms inboard and outboard refer to the position of the brackets relative to the engine centerline CL (FIG. 1A) and the fuselage (e.g. the locations between the centerline CL and the fuselage may be referred to as inboard and locations on the opposite side of the centerline CL may be referred to as outboard). In one aspect the bracket 200A, 200B includes actuator mounting member 210 and a bulkhead interface member 211 connected to the actuator interface member 210 by a connecting member 212. The actuator mounting member 210, bulkhead interface member 211 and connecting member 212 may be integrally formed as a unitary one piece member. In one aspect the actuator interface member 210 may be substantially parallel with the bulkhead interface member 211 while in other aspects, the actuator interface member 210 and the bulkhead interface member 211 may have any suitable spatial arrangement relative to one another. The actuator interface member 210 may include one or more hole patterns 201, 202, 203 configured for mounting one or more actuators to the bracket 200A, 200B. In this aspect one or more holes from hole patterns 201, 202 may be used for mounting actuator 151, 153 to the bracket 200A, 200B along the top/bottom or vertical axis while one or more holes of hole pattern 203 may be used for mounting actuator 150, 152 along the fore/aft axis. In other aspects the actuators may be mounted in any suitable arrangement along any suitable axes of the aircraft 100. The hole patterns 201, 202, 203 may have any suitable number of holes with any suitable spacing corresponding to the mounting holes of the respective actuators. The bulkhead interface member 211 may include any suitable peripheral contour PC so that a hole pattern 269 (e.g. including mounting holes 261-264 and clearance holes 265-268) may be included in the bulkhead interface member 211. In one aspect the mounting holes 261-264 may be positioned on the bulkhead interface member 211 so that the mounting holes 261-264 are arranged to match existing fastener holes 190H (FIG. 1D) of the engine strut 190. Here the existing fastener holes 190H may be used for mounting the bracket 200A, 200B to the engine strut aft bulkhead 190B. In other aspects mounting holes may be added as desired in the engine strut 190 for mounting the bracket 200A, 200B. Any suitable clearance holes or recesses 265-268 may also be provided in the bulkhead interface member 211 so that the bracket 200A may be installed over existing fasteners included in the engine strut 190 so that active vibration control may be retrofitted to, for example, the aircraft 100 such as, for example, the Boeing 737NG. As may be realized the bulkhead interface member 211 may also include any suitable interface surface contour ISC so that the interface surface IS of the bulkhead interface member 211 substantially corresponds to and is in substantially contact with a mounting surface of the engine strut aft bulkhead 190B again allowing retrofitting of active vibration control to the aircraft 100. The connecting member 212 may include one or more apertures 205, 206 configured to allow tool TL access to each fastener 299 that fastens or otherwise secures each actuator 150, 151, 152, 153 to the respective bracket 200A, 200B while the bracket 200A, 200B remains affixed to the engine strut 190.

Referring now to FIGS. 1E and 3A-3C outboard bracket 350 includes an actuator interface member 310 and a wing fitting interface member 311. In this aspect the actuator interface member 310 and wing fitting interface member 311 may be of unitary one piece construction and have a substantially "L" shaped cross section (e.g. the actuator interface member 310 and wing fitting interface member 311 are substantially perpendicular or arranged at a non-zero angle relative to one another). Any suitable stiffening/reinforcing members 315 may be provided between and connect the actuator interface member 310 and a wing fitting interface member 311. The actuator interface member 310 may include any suitable hole pattern 302 that substantially corresponds to a mounting hole pattern of the actuator 155 for mounting or otherwise affixing the actuator 155 to the bracket 350 so that the actuator is oriented along the fore/aft axis. In other aspects the bracket 350 may be configured to mount the actuator along any suitable axis of the aircraft 100. In one aspect locking members 390 may be provided where the locking members 390 are configured for anchoring of anti-rotation locking cables 391. For example, fasteners 392 used to affix the actuator 155 to the bracket 350 may also secure a respective locking member 390 to the bracket 350. One or more anti-rotation locking cables 391 may pass through the fastener 392 and the ends of the one or more anti-rotation locking cables 391 may be anchored to the respective locking member 390 for substantially preventing rotation of the fasteners 392. The locking members 390 may have any suitable shape and/or configuration, such as the "U" shaped configuration illustrated in the figures so that the locking member 390 can be mounted to the bracket 350 substantially without interference with the actuator interface member 310, the wing fitting interface member 311 and the stiffening/reinforcing members 315. The wing fitting interface member 311 may include a hole pattern 303 including mounting holes 303M1-303M4. In one aspect the mounting holes 303M1-303M4 may be positioned on the wing fitting interface member 311 so that the mounting holes 303M1-303M4 are arranged to match existing fastener holes 171H (FIG. 1E) of the outboard wing fitting 171. Here the existing fastener holes 171H may be used for mounting the bracket 350 to the wing fitting 171. In other aspects mounting holes may be added as desired in the wing fitting 171 for mounting the bracket 350. Any suitable clearance holes or recesses (not shown) may also be provided in the wing fitting interface member 311. As may be realized, the bracket 350 may be installed over existing fasteners and using existing holes included in the wing fitting 171 (or in other aspects holes may be added as desired) so that active vibration control may be retrofitted to, for example, the aircraft 100 such as, for example, the Boeing 737NG. As may also be realized, the wing fitting interface member 311 may also include any suitable interface surface contour ISC2 so that the interface surface IS2 of the wing fitting interface member 311 substantially corresponds to and is in substantially contact with a mounting surface of the wing fitting 171 again allowing retrofitting of active vibration control to the aircraft 100.

Referring now to FIGS. 1E and 4A-4C inboard bracket 300 may be substantially similar to the outboard bracket 350 described above. However, in one aspect the outboard bracket 350 may have an actuator interface member 310 with a length X1 (FIG. 3A) and inboard bracket 300 may have an actuator interface member 410 having a length X2 (and an actuator mounting hole pattern 402 that is different than the hole pattern 302). This difference in configuration between bracket 300 and bracket 350 may allow for mounting of the respective actuators 154, 155 in differing orientations (e.g. actuator 155 may be mounted in one of a fore/aft orientation, lateral orientation or vertical orientation while actuator 154 is mounted in a different one of the fore/aft orientation, lateral orientation or vertical orientation) to counteract engine vibrations along the fore/aft and lateral directions. In other aspects the inboard bracket 300 and outboard bracket 350 may be configured for mounting the respective actuators along the same axis (e.g. both brackets are configured to mount their respective actuators in one of the fore/aft axis, lateral axis or vertical axis).

In accordance with an aspect of the disclosed embodiment the inboard bracket 300 includes an actuator interface member 410 and a wing fitting interface member 411. In this aspect the actuator interface member 410 and wing fitting interface member 411 may be of unitary one piece construction and have a substantially "L" shaped cross section (e.g. the actuator interface member 410 and wing fitting interface member 411 are substantially perpendicular or arranged at a non-zero angle relative to one another). Any suitable stiffening/reinforcing members 415 may be provided between and connect the actuator interface member 410 and a wing fitting interface member 411. The actuator interface member 410 may include any suitable hole pattern 402 that substantially corresponds to a mounting hole pattern of the actuator 154 for mounting or otherwise affixing the actuator 154 to the bracket 300. In one aspect locking members 490 may be provided where the locking members 490 are configured for anchoring of anti-rotation locking cables 491. For example, fasteners 492 used to affix the actuator 154 to the bracket 300 may also secure a respective locking member 490 to the bracket 300. One or more anti-rotation locking cables 491 may pass through the fastener 492 and the ends of the one or more anti-rotation locking cables 491 may be anchored to the respective locking member 490 for substantially preventing rotation of the fasteners 492. The locking members 490 may have any suitable shape and/or configuration, such as the "U" shaped configuration illustrated in the figures so that the locking member 490 can be mounted to the bracket 300 substantially without interference with the actuator interface member 410, the wing fitting interface member 411 and the stiffening/reinforcing members 415. The wing fitting interface member 411 may include a hole pattern 403 including mounting holes 404M1-404M4. In one aspect the mounting holes 404M1-404M4 may be positioned on the wing fitting interface member 411 so that the mounting holes 404M1-404M4 are arranged to match existing fastener holes 170H (FIG. 1E) of the inboard wing fitting 170. Here the existing fastener holes 170H may be used for mounting the bracket 300 to the wing fitting 170. In other aspects mounting holes may be added as desired in the wing fitting 170 for mounting the bracket 300. Any suitable clearance holes or recesses (not shown) may also be provided in the wing fitting interface member 411. As may be realized, the bracket 300 may be installed over existing fasteners and using existing holes included in the wing fitting 170 (or in other aspects holes may be added as desired) so that active vibration control may be retrofitted to, for example, the aircraft 100 such as, for example, the Boeing 737NG. As may also be realized, the wing fitting interface member 411 may also include any suitable interface surface contour ISC3 so that the interface surface IS3 of the wing fitting interface member 411 substantially corresponds to and is in substantially contact with a mounting surface of the wing fitting 170 again allowing retrofitting of active vibration control to the aircraft 100.

In one aspect the combined stiffness and the mass of each bracket 200A, 200B, 300, 350 may be tuned so that the lowest modal frequency (fundamental mode) of the bracket 200A, 200B, 300, 350 is outside of the actuator operational frequency (which may correspond to a spool of the engine 102) by any suitable amount such as, for example, a factor of two. For example, in one aspect the engine 102 may include shaft spools (speeds) corresponding to low pressure, medium pressure and high pressure compressors (that may respectively be referred to as N1, N2 and N3 spools). In other aspects the engine may include more or less than three spools and the brackets may be tuned to so that the first modal frequency of each bracket is outside the highest frequency range of one or more of the spools. The actuators 150-155 may be configured to counter the vibration/noise of more than one spool (such as for example, the N1, N2 and/or the N3 spools). In one aspect each bracket 200A, 200B, 300, 350 may be configured such that lowest modal frequency of the bracket is outside a predetermined frequency by any suitable margin (such as a factor of two) where the predetermined frequency is, for example, the actuator operational frequency/spool frequency (e.g. corresponding to one or more of the N1, N2 and N3 engine shaft speeds) which in one aspect, for the N2 spool, is about 160 Hz. For example, the brackets 200A, 200B, 300, 350 may have a lowest modal frequency of about 320 Hz or above with respect to cancelling N2 noise/vibration. In other aspects, the brackets 200A, 200B, 300, 350 may have any suitable frequency higher than the actuator/engine spool frequency. As may be realized, the brackets 200A, 200B, 300, 350 may be common brackets with respect to actuators that are configured cancellation of vibrations/noise produced by the N1, N2 and N3 spools in that the brackets may remain fixed to the aircraft structure regardless of whether the actuator(s) mounted to a respective bracket are configured to counteract the N1 and/or N2 spools. As may be realized, each bracket 200A, 200B, 300, 350 may also be configured to withstand static loads and fatigue induced in the bracket by the actuators or other forces exerted on the aircraft 100.

As described above, the active vibration control brackets 200A, 200B, 300, 350 in accordance with the aspects of the disclosed embodiment are configured so that active vibration control can be retrofit to an existing aircraft 100 with minimal or substantially no modifications to the aircraft while providing substantially unhindered installation and removal access to each actuator mounted to the brackets 200A, 200B, 300, 350. As described above, existing fastener or other holes located in, for example, the engine mounting structure may be used for mounting of one or more of the brackets 200A, 200B, 300, 350 with minimal modification to existing aircraft engine mounting structure (e.g. where "minimal modification" is defined as redirecting a hose and replacing a T-stiffener of the engine mounting structure). In one aspect minor modifications may be provided with one or more of the brackets 200A, 200B, 300, 350 to allow the retrofit of the active vibration control. For example, referring again to FIG. 1C, one or more suitable mounting brackets/fixtures 140 may be provided to redirect one or more fluid hoses 141 around the brackets 200A, 200B, 300, 350 and/or actuators 150-155. The mounting brackets/fixtures 140 may also be configured, in a manner similar to that described above, so that the mounting brackets/fixtures 140 use existing holes in the engine mounting structure for mounting the mounting brackets/fixtures 140 to the engine structure. In other aspects, holes may be added to the engine structure as desired for mounting the mounting brackets/fixtures 140 and redirecting the fluid hoses. Suitable stiffening members of the engine mounting structure may also be provided. For example, a retrofit T-stiffener 180 may be provided to replace an original equipment T-stiffener used to stiffen the engine mounting structure. In one aspect the retrofit T-stiffener 180 may be configured to provide clearance for and access to the actuators 150-155 and/or brackets 200A, 200B, 300, 350. In one aspect the retrofit T-stiffener 180 may have any suitable shape and/or configuration and may be provided as a unitary one piece member or as component parts 180A, 180B, 180C that are fastened together in any suitable manner. In one aspect, a retrofit kit may be provided for retrofitting an active vibration control system to an existing aircraft 100 where the retrofit kit includes one or more of the brackets 200A, 200B, 300, 350, one or more hose relocation brackets/fixtures 140 and any suitable stiffening members 180.

In accordance with one or more aspects of the disclosed embodiment an active vibration control actuator mount includes at least one actuator bracket having an actuator interface member configured to hold one or more active vibration element thereon in one or more predetermined orientations, and an engine mounting structure interface member connected to the actuator interface member, the engine mounting structure interface member being configured to couple the at least one actuator bracket to an engine mounting structure; wherein the at least one actuator bracket is configured for the installation and removal of a respective active vibration element to and from the actuator interface member while a respective one of the at least one actuator bracket remains coupled to the engine mounting structure.

In accordance with one or more aspects of the disclosed embodiment the actuator interface member and the engine mounting structure interface member are arranged at a non-zero angle relative to each other.

In accordance with one or more aspects of the disclosed embodiment the actuator interface member and the engine mounting structure interface member are arranged substantially parallel relative to each other.

In accordance with one or more aspects of the disclosed embodiment the actuator interface member and the engine mounting structure interface member of a first one of the at least one actuator bracket are arranged at a non-zero angle relative to each other.

In accordance with one or more aspects of the disclosed embodiment the actuator interface member and the engine mounting structure interface member of a second one of the at least one actuator bracket are arranged substantially parallel relative to each other.

In accordance with one or more aspects of the disclosed embodiment the at least one actuator bracket is dynamically tuned so that a first modal frequency of the at least one actuator bracket is outside an operational frequency of a respective active vibration element mounted to the at least one actuator bracket.

In accordance with one or more aspects of the disclosed embodiment the at least one actuator bracket includes apertures configured such that tools are inserted through the apertures for one or more of installing and removing a respective active vibration element mounted to the at least one actuator bracket.

In accordance with one or more aspects of the disclosed embodiment the at least one actuator bracket is configured to couple to the engine mounting structure of a Boeing 737 using preexisting fastener holes of the engine mounting structure.

In accordance with one or more aspects of the disclosed embodiment the at least one actuator bracket is configured to couple to the engine mounting structure with minimal modification to the engine mounting structure.

In accordance with one or more aspects of the disclosed embodiment a method for mounting active vibration control actuators to an engine mounting structure includes providing at least one actuator bracket; providing an actuator interface member on the at least one actuator bracket for holding one or more active vibration elements thereon in one or more predetermined orientations; and providing an engine mounting structure interface member on the at least one actuator bracket and connected to the actuator interface member for coupling the at least one actuator bracket to an engine mounting structure; wherein the at least one actuator bracket provides for the installation and removal of the one or more active vibration elements from the actuator interface member while a respective one of the at least one actuator bracket remains coupled to the engine mounting structure.

In accordance with one or more aspects of the disclosed embodiment the actuator interface member and the engine mounting structure interface member of a first one of the at least one actuator bracket are arranged at a non-zero angle relative to each other.

In accordance with one or more aspects of the disclosed embodiment the actuator interface member and the engine mounting structure interface member of a second one of the at least one actuator bracket are arranged substantially parallel relative to each other.

In accordance with one or more aspects of the disclosed embodiment the method further includes dynamically tuning the at least one actuator bracket so that a first modal frequency of the at least one actuator bracket is outside an operational frequency of a respective active vibration element mounted to the at least one actuator bracket.

In accordance with one or more aspects of the disclosed embodiment the method further includes providing the at least one actuator bracket with apertures through which tools are inserted for one or more of installing and removing a respective active vibration element mounted to the at least one actuator bracket.

In accordance with one or more aspects of the disclosed embodiment the engine mounting structure is of a Boeing 737 and coupling the at least one actuator bracket to the engine mounting structure comprises using preexisting fastener holes of the engine mounting structure.

In accordance with one or more aspects of the disclosed embodiment coupling the at least one actuator bracket to the engine mounting structure comprises coupling the at least one actuator bracket to the engine mounting structure with minimal modification to the engine mounting structure.

In accordance with one or more aspects of the disclosed embodiment the method further includes providing at least one additional actuator bracket so that at least one additional active vibration element is mounted to the engine mounting structure in an orientation that is common to or different than the one or more predetermined orientations.

In accordance with one or more aspects of the disclosed embodiment an active vibration control actuator mount includes a first actuator bracket having an actuator interface member configured to hold one or more active vibration element thereon in one or more predetermined orientation, and an engine mounting structure interface member connected to the actuator interface member, the engine mounting structure interface member being configured to couple the at least one actuator bracket to a first mounting location of an engine mounting structure; a second actuator bracket having an actuator interface member configured to hold one or more active vibration element thereon in one or more predetermined orientation, and an engine mounting structure interface member connected to the actuator interface member, the engine mounting structure interface member being configured to couple the at least one actuator bracket to a second mounting location of an engine mounting structure distinct from the first mounting location; wherein each of the first actuator bracket and the second actuator bracket are configured for the installation and removal of a respective active vibration element to and from the actuator interface member while a respective one of the first actuator bracket and second actuator bracket remains coupled to the engine mounting structure.

In accordance with one or more aspects of the disclosed embodiment the one or more predetermined orientation of the first actuator bracket and the one or more predetermined orientation of the second actuator bracket include at least one common orientation.

In accordance with one or more aspects of the disclosed embodiment the one or more predetermined orientation of the first actuator bracket and the one or more predetermined orientation of the second actuator bracket include at least one different orientation.

In accordance with one or more aspects of the disclosed embodiment the first actuator bracket and the second actuator bracket are configured to couple to the engine mounting structure of a Boeing 737 using preexisting fastener holes of the engine mounting structure with minimal modification to the engine mounting structure.

In accordance with one or more aspects of the disclosed embodiment an active vibration actuator bracket mounting system includes more than one actuator bracket, each actuator bracket including an actuator interface member configured to hold one or more active vibration element thereon in one or more predetermined orientations, an engine mounting structure interface member connected to the actuator interface member, the engine mounting structure interface member being configured to couple the at least one actuator bracket to an engine mounting structure, and each actuator bracket being configured to mount in a predetermined location of an aircraft engine mounting structure and hold at least one active vibration element in a predetermined orientation; wherein at least one bracket is selected from the more than one brackets for placement in the predetermined location of the aircraft engine mounting structure where placement of the at least one bracket in a respective predetermined location effects at least reduction of an aircraft engine vibration along at least one axis of the aircraft.

In accordance with one or more aspects of the disclosed embodiment each actuator bracket is configured for the installation and removal of a respective active vibration element to and from the actuator interface member while a respective one of the at least one actuator bracket remains coupled to the engine mounting structure.

In accordance with one or more aspects of the disclosed embodiment the actuator interface member and the engine mounting structure interface member are arranged at a non-zero angle relative to each other.

In accordance with one or more aspects of the disclosed embodiment the actuator interface member and the engine mounting structure interface member are arranged substantially parallel relative to each other.

In accordance with one or more aspects of the disclosed embodiment the actuator interface member and the engine mounting structure interface member of a first one of the more than one actuator bracket are arranged at a non-zero angle relative to each other, and the actuator interface member and the engine mounting structure interface member of a second one of the more than one actuator bracket are arranged substantially parallel relative to each other.

In accordance with one or more aspects of the disclosed embodiment each actuator bracket is dynamically tuned so that a first modal frequency of each actuator bracket is outside an operational frequency of a respective active vibration element mounted to a respective actuator bracket.

In accordance with one or more aspects of the disclosed embodiment at least one actuator bracket includes apertures configured such that tools are inserted through the apertures for one or more of installing and removing a respective active vibration element mounted to the at least one actuator bracket.

In accordance with one or more aspects of the disclosed embodiment each actuator bracket is configured to couple to the engine mounting structure of a Boeing 737 using preexisting fastener holes of the engine mounting structure.

In accordance with one or more aspects of the disclosed embodiment each actuator bracket is configured to couple to the engine mounting structure with minimal modification to the engine mounting structure.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:
1. An active vibration control actuator mount comprising: at least one actuator bracket including
 an actuator interface member configured to hold one or more active vibration element thereon in one or more predetermined orientations, and
 an engine mounting structure interface member connected to the actuator interface member, the engine mounting structure interface member being configured to couple the at least one actuator bracket to an engine mounting structure;
wherein the at least one actuator bracket is configured for the installation and removal of a respective active vibration element to and from the actuator interface member while a respective one of the at least one actuator bracket remains coupled to the engine mounting structure, and the at least one actuator bracket is dynamically tuned so that a first modal frequency of the at least one actuator bracket is outside on operational frequency of a respective active vibration element mounted to the at least one actuator bracket.

2. The active vibration control actuator mount of claim 1, wherein the actuator interface member and the engine mounting structure interface member are arranged at a non-zero angle relative to each other.

3. The active vibration control actuator mount of claim 1, wherein the actuator interface member and the engine mounting structure interface member are arranged substantially parallel relative to each other.

4. The active vibration control actuator mount of claim 1, wherein the actuator interface member and the engine mounting structure interface member of a first one of the at least one actuator bracket are arranged at a non-zero angle relative to each other.

5. The active vibration control actuator mount of claim 4, wherein the actuator interface member and the engine mounting structure interface member of a second one of the at least one actuator bracket are arranged substantially parallel relative to each other.

6. The active vibration control actuator mount of claim 1, wherein the at least one actuator bracket includes apertures configured such that tools are inserted through the apertures for one or more of installing and removing a respective active vibration element mounted to the at least one actuator bracket.

7. The active vibration control actuator mount of claim 1, wherein the at least one actuator bracket is configured to couple to the engine mounting structure of a Boeing 737 using preexisting fastener holes of the engine mounting structure.

8. The active vibration control actuator mount of claim 1, wherein a combined stiffness and a mass of the at least one actuator bracket is tuned.

9. The active vibration control actuator mount of claim 1, wherein the operational frequency of the respective active vibration element corresponds to an operational frequency of one or more spools of an aircraft engine.

10. The active vibration control actuator mount of claim 9, wherein the one or more spools comprise one or more of a low pressure compressor, a medium pressure compressor and a high pressure compressor of the aircraft engine.

11. The active vibration control actuator mount of claim 1, wherein the at least one actuator bracket is tuned so that the first modal frequency of the at least one actuator bracket is outside the highest frequency range of one or more spools of an aircraft engine.

12. The active vibration control actuator mount of claim 1, wherein the respective active vibration element is configured to counter one or more of vibration and noise of more than one spool of an aircraft engine.

13. The active vibration control actuator mount of claim 1, wherein the first modal frequency of the at least one actuator bracket is a multiple of an operational frequency of one or more spools of an aircraft engine.

14. A method for mounting active vibration control actuators to an engine mounting structure, the method comprising:
providing at least one actuator bracket;
providing an actuator interface member on the at least one actuator bracket for holding one or more active vibration elements thereon in one or more predetermined orientations;
providing an engine mounting structure interface member on the at least one actuator bracket and connected to the actuator interface member for coupling the at least one actuator bracket to an engine mounting structure; and
dynamically tuning the at least one actuator bracket so that a first modal frequency of the at least one actuator bracket is outside an operational frequency of a respective active vibration element mounted to the at least one actuator bracket
wherein the at least one actuator bracket provides for the installation and removal of the one or more active vibration elements from the actuator interface member while a respective one of the at least one actuator bracket remains coupled to the engine mounting structure.

15. The method of claim 14, wherein the actuator interface member and the engine mounting structure interface member of a first one of the at least one actuator bracket are arranged at a non-zero angle relative to each other.

16. The method of claim 15, wherein the actuator interface member and the engine mounting structure interface member of a second one of the at least one actuator bracket are arranged substantially parallel relative to each other.

17. The method of claim 14, further comprising providing the at least one actuator bracket with apertures through which tools are inserted for one or more of installing and removing a respective active vibration element mounted to the at least one actuator bracket.

18. The method of claim 14, wherein the engine mounting structure is of a Boeing 737 and coupling the at least one actuator bracket to the engine mounting structure comprises using preexisting fastener holes of the engine mounting structure.

19. The method of claim 18, wherein coupling the at least one actuator bracket to the engine mounting structure comprises coupling the at least one actuator bracket to the engine mounting structure with minimal modification to the engine mounting structure.

20. The method of claim 14, further comprising providing at least one additional actuator bracket so that at least one additional active vibration element is mounted to the engine mounting structure in an orientation that is common to or different than the one or more predetermined orientations.

21. An active vibration control actuator mount comprising:
a first actuator bracket including
an actuator interface member configured to hold one or more active vibration element thereon in one or more predetermined orientation, and
an engine mounting structure interface member connected to the actuator interface member, the engine mounting structure interface member being configured to couple the first actuator bracket to a first mounting location of an engine mounting structure;
a second actuator bracket including
an actuator interface member configured to hold one or more active vibration element thereon in one or more predetermined orientation, and
an engine mounting structure interface member connected to the actuator interface member, the engine mounting structure interface member being configured to couple the second actuator bracket to a second mounting location of the engine mounting structure distinct from the first mounting location;
wherein each of the first actuator bracket and the second actuator bracket are configured for the installation and removal of a respective active vibration element to and from the actuator interface member while a respective one of the first actuator bracket and second actuator bracket remains coupled to the engine mounting structure, and each of the first actuator bracket and second actuator bracket is dynamically tuned that a first modal frequency of the at least one actuator bracket is outside an operational frequency of a respective active vibration element mounted to a respective one of the first actuator bracket and second actuator bracket.

22. The active vibration control actuator mount of claim 21, wherein the one or more predetermined orientation of the first actuator bracket and the one or more predetermined orientation of the second actuator bracket include at least one common orientation.

23. The active vibration control actuator mount of claim 21, wherein the one or more predetermined orientation of the first actuator bracket and the one or more predetermined orientation of the second actuator bracket include at least one different orientation.

24. The active vibration control actuator mount of claim 21, wherein the first actuator bracket and the second actuator bracket are configured to couple to the engine mounting structure of a Boeing 737 using preexisting fastener holes of the engine mounting structure with minimal modification to the engine mounting structure.

* * * * *